(12) United States Patent
Yamashita et al.

(10) Patent No.: US 6,620,890 B1
(45) Date of Patent: Sep. 16, 2003

(54) COMPOSITION FOR PEELABLE COATING

(75) Inventors: Kenji Yamashita, Hadano (JP); Masayuki Matsuki, Hadano (JP); Noritsumi Matsuyama, Hadano (JP); Takanori Endo, Hadano (JP); Hideaki Tojo, Sayama (JP); Hisashi Kurota, Sayama (JP)

(73) Assignees: Rinrei Wax Co., Ltd. (JP); Honda Giken Kogyo Kabushiki Kaisha (JP)

( * ) Notice: Subject to any disclaimer, the term of this patent is extended or adjusted under 35 U.S.C. 154(b) by 0 days.

(21) Appl. No.: 09/668,211

(22) Filed: Sep. 22, 2000

(30) Foreign Application Priority Data

Sep. 27, 1999 (JP) ............................................. 11-271870

(51) Int. Cl.$^7$ ............................. C08L 91/00; C08K 5/01
(52) U.S. Cl. ...................... 525/222; 525/308; 523/201; 524/560; 524/561
(58) Field of Search ........................ 523/201; 525/222, 525/308, 902; 524/560, 561

(56) References Cited

U.S. PATENT DOCUMENTS

| | | | | |
|---|---|---|---|---|
| 4,150,005 | A | * 4/1979 | Gehman et al. | 523/201 |
| 4,385,152 | A | * 5/1983 | Boyack et al. | 524/522 |
| 5,399,621 | A | 3/1995 | Kohlhammer | |
| 5,981,627 | A | * 11/1999 | Shih et al. | 523/201 |
| 6,211,282 | B1 | * 4/2001 | Yamashita et al. | 524/501 |

FOREIGN PATENT DOCUMENTS

| | | |
|---|---|---|
| DE | 4236672 | 5/1994 |
| DE | 19652728 | 6/1997 |
| EP | 0369581 | 5/1990 |
| EP | 0911375 | 4/1999 |

OTHER PUBLICATIONS

Patent Abstracts of Japan, 06155497, Mar. 6, 1994 (1 page).

* cited by examiner

Primary Examiner—James J. Seidleck
Assistant Examiner—Olga Asinovsky
(74) Attorney, Agent, or Firm—Muserlian, Lucas and Mercanti

(57) ABSTRACT

A composition for peelable coating, which composition exhibits excellent properties such as film-formability and water resistance and can be dried at ambient temperature without any particular heating, to thereby provide excellent coating performance. The composition contains a core/shell copolymer including an acrylic copolymer portion A having a high glass transition temperature of 30° C.–70° C. and an acrylic copolymer portion B having a low glass transition temperature of 5° C. to −30° C. and being formed through multi-step polymerization. The core/shell copolymer is made up of 5–40 wt. % of the acrylic copolymer portion A and 60–95 wt. % of the acrylic copolymer portion B, on the basis of the total amount of the portion A and the portion B. The acrylic copolymer portion A and the acrylic copolymer portion B contain the same hard-polymer-providing monomer unit and soft-polymer-providing monomer unit. Each copolymer portion contains a hard-polymer-providing monomer unit and a soft-polymer-providing monomer unit in a total amount of 70 wt. % or more.

11 Claims, 5 Drawing Sheets

Clearly segregated dual structure

Continuous dual structure

Homogeneous structure

● Example
○ Comparative Example

COMPOSITION FOR PEELABLE COATING

BACKGROUND OF THE INVENTION

1. Field of the Invention

The present invention relates to a composition for peelable coating, and more particularly to an aqueous composition for peelable coating that suitably protects the appearance of an object temporarily and forms a coating film having excellent physical properties and peelability.

2. Background Art

Before delivery to customers, automobiles and other vehicles (hereinafter simply referred to as vehicles) are usually stored in an open-air stock yard, or transported under their own power or by means of a cargo train, a trailer, or a ship. During storage or transportation, vehicles may be damaged due to contact with other objects or blemished (e.g., spotting, discoloring, staining, aging) by agents such as sand dust, iron powder, salts, alkalis, and acids; smoke; bird droppings; dead insects or the body fluids of insects; sunlight; or by the elements, such as acid rain.

Once a vehicle is damaged or stained, the commercial value thereof decreases considerably. In order to prevent this, vehicles must be temporarily protected for a certain period of time. Under a known conventional method, upon shipping, protective film prepared from a composition that forms peelable coating is applied to such objects, and the film is removed after the storage period is over.

Other than vehicles, a variety of objects, including ferrous or nonferrous metallic articles such as mechanical parts; houseware; wood articles; glass products; plastic products; and rubber products (hereinafter simply referred to as objects) are stored indoors or outdoors over the distribution period. In order to maintain the commercial value thereof, formation of a protective film on a surface of an object has been proposed.

Such a protective film must meet the following requirements 1) to 5).

1) The protective film must be able to adhere to an object in such a way that the film does not spontaneously peel off the object during storage yet can be easily peeled off when necessary.

2) The protective film covering an object must have excellent physical properties; e.g., tensile strength and elongation, such that the film be can easily peeled off the object without breaking the film.

3) The protective film covering an object must have excellent film properties; e.g., water resistance, light resistance, and thermal stability, such that film characteristics and peelability do not vary during storage of the object.

4) The protective film covering an object must protect the object both chemically and physically.

5) The protective film covering an object should not affect the object detrimentally.

The present inventors have already proposed an aqueous dispersion of a peelable coating composition which provides protective film and satisfies the aforementioned characteristics (See U.S. Pat. No. 6,211,282). The said patent discloses an aqueous dispersion of a peelable coating composition providing protective film, which dispersion is formed of a mixture of an emulsion containing an acrylic copolymer having a glass transition temperature of 40° C. or higher and an emulsion containing an acrylic copolymer having a glass transition temperature of 5° C. to −20° C. The coating satisfies the aforementioned requirements.

However, the composition for peelable resin coating when applied to a surface of an object must be heated; e.g., at approximately 70–80° C., so as to form a protective film and develop the aforementioned characteristics required of the protective film.

As in similar cases of conventional compositions for peelable coating, the resin composition exhibits physical properties such as mechanical strength and elongation of film brought about through heating at a high temperature. Drying of the resin composition at ambient temperature requires a long period of time, and the performance of the dried film is poorer than that of a high-temperature-heated product.

In addition, when the composition is dried at ambient temperature, the formed protective film has poor water resistance and absorbs water if rainfall is prolonged. Thus, the protective film detaches from the object and peels off the object under its own weight.

When the aforementioned resin composition for peelable coating is applied at a low temperature, film-formability is poor and in some cases the composition per se cannot be used.

In the present invention, the term "ambient temperature" is not particularly defined. However, the term refers to temperatures higher than 0° C.; i.e., temperatures at which water does not freeze during operation, generally 5–35° C.±5° C.

In recent years, there has been increasing demand for protective coating film that can be applied to a wide range of objects; i.e., from small objects to automobiles. Thus, the protective film must be usable under a wide range of conditions for application and storage. Such circumstances require that a composition for peelable coating have excellent properties such as film-formability and water resistance and can be dried at ambient temperature without the need for particular heating, thereby providing coating performance.

In order to solve the aforementioned drawbacks, an object of the present invention is to provide a composition for peelable coating, which composition has excellent properties such as film-formability and water resistance and can be dried at ambient temperature without the need for particular heating, thereby providing satisfactory coating performance.

SUMMARY OF THE INVENTION

In view of the foregoing, the present inventors have conducted extensive studies in order to solve the aforementioned drawbacks, and have found that an excellent composition for peelable coating can be obtained from a copolymer comprising at least two acrylic copolymer portions having a specified glass transition temperature range and prepared through multi-step polymerization. The present invention has been accomplished on the basis of this finding.

Accordingly, the present invention provides an aqueous composition for peelable coating, which forms peelable coating for protecting a surface of an object for a specific period of time and can be peeled off after providing necessary protection, which composition contains a core/shell copolymer comprising, in the molecule thereof, an acrylic copolymer portion A having a high glass transition temperature of 30° C.–70° C. and an acrylic copolymer portion B having a low glass transition temperature of 5° C. to −30° C. and being formed through multi-step polymerization.

Preferably, particles of the core/shell copolymer has a continuous dual-phase structure.

Preferably, the core is made up of the copolymer portion A and the shell is made up of the copolymer portion B.

Preferably, the core/shell copolymer comprises 5–40 wt. % of the acrylic copolymer portion A and 60–95 wt. % of the acrylic copolymer portion B, on the basis of the total amount of the portion A and the portion B.

Preferably, each copolymer portion contains a hard-polymer-providing monomer unit and a soft-polymer-providing monomer unit in a total amount of 70 wt. % or more.

Preferably, neither the acrylic copolymer portion A nor the acrylic copolymer portion B contains a monomer unit formed of a nitrogen-containing vinyl monomer.

Preferably, a vinyl monomer having an acidic functional group is contained in an amount of 0.2–2 wt. % based on the total amount of monomers.

Preferably, a reactive surfactant is used during formation of an emulsion of the acrylic copolymer portion A or the acrylic copolymer portion B.

Preferably, the composition contains a peelability-enhancing agent.

The present invention also provides a peelable coating film which can be easily peeled off an object and is obtained from a composition for peelable coating as recited above.

The present invention also provides an object having a peelable coating film which can be easily peeled off the object and is obtained from a composition for peelable coating as recited above.

The present invention also provides a method for protecting the surface of an object, which method comprises forming, on the surface of the object, a peelable coating film obtained from a composition for peelable coating as recited above.

Preferably, in the method, the peelable protective coating film is formed at 40° C. or lower.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with the accompanying drawings, in which.

DETAILED DESCRIPTION OF PREFERRED EMBODIMENTS

The aqueous composition of the present invention for peelable coating, which forms peelable coating protecting a surface of an object for a specific period of time and can be peeled off after affording necessary protection, contains a core/shell copolymer comprising an acrylic copolymer portion A having a high glass transition temperature of 30° C.–70° C. and an acrylic copolymer portion B having a low glass transition temperature of 5° C. to −30° C. and being formed through multi-step polymerization. More particularly, the core/shell copolymer comprises 5–40 wt. % of the acrylic copolymer portion A and 60–95 wt. % of the acrylic copolymer portion B, on the basis of the total amount of the portion A and the portion B. The acrylic copolymer portion A and the acrylic copolymer portion B contain the same hard-polymer-providing monomer unit and soft-polymer-providing monomer unit. Each copolymer portion contains a hard-polymer-providing monomer unit and a soft-polymer-providing monomer unit in a total amount of 70 wt. % or more.

The composition of the present invention for peelable coating is applied to an object; e.g., a vehicle, thereby forming a protective coating film through drying at ambient temperature without the need for drying at a high temperature as conventionally required.

In the present invention, the term "hard-polymer-providing monomer" refers to a monomer which provides its homopolymer having a glass transition temperature of 50° C. or higher. Similarly, the term "soft-polymer-providing monomer" refers to a monomer which provides its homopolymer having a glass transition temperature of −10° C. or lower.

The terms "hard-polymer-providing monomer unit" and "soft-polymer-providing monomer unit" refer to a monomer unit in the copolymer obtained from the hard-polymer-providing monomer and a monomer unit in the copolymer obtained from the soft-polymer-providing monomer, respectively.

The term "monomer unit" refers to the largest structural unit contained in the polymer which is formed from one molecule of the monomer.

In the present invention, the term "acrylic copolymer portion" refers to a copolymer portion predominantly formed from an acrylate ester or a methacrylate ester.

Glass transition temperature (Tg) is the temperature at which an amorphous polymer of a comparatively hard and fragile glassy state undergoes transition to a comparatively soft and viscous rubber state.

In the present invention, the glass transition temperature of a polymer is a calculated temperature. For example, the Tg of a copolymer can be calculated from Fox's equation described below (See. *Bulletin of American Physical Society*, 1, 3, p. 123 (1956)):

$$1/Tg = W1/Tg(1) + W2/Tg(2) \ldots \quad (1)$$

wherein W1 and W2 represent the weight fraction of a polymer of component 1 and that of component 2, respectively, and Tg(1) and Tg(2) represent the glass transition temperature (unit: absolute temperature) of a homopolymer of component 1 and that of component 2, respectively.

Although a variety of methods for experimentally measuring the glass transition temperature of an obtained polymer are known, differential scanning calorimetry (DSC) is preferred, due to its simplicity and precision.

When Tg is measured through DSC, a copolymer sample is sequentially dried, heated to 120° C., rapidly cooled to −100° C., and heated again to 150° C. at 20° C./minute with data sampling. Tg is obtained at an inflection point through a half-height method. Glass transition temperatures for a variety of homopolymers are listed in, for example, Polymer Handbook (J. Brandrup and E. H. Immergit, Interscience Publisher).

In the copolymer contained in the composition of the present invention, the acrylic copolymer portion A has a glass transition temperature of 30° C.–70° C., preferably 30° C.–60° C.

The acrylic copolymer portion B has a glass transition temperature of 5° C. to −30° C., preferably 5° C. to −20° C.

The term "copolymer portion" refers to a portion in a molecular chain, having specific proportions and species of monomer units. In other words, a copolymer portion is a portion in a molecular chain which is recognized to be polymerized from a single monomer mixture.

For example, a copolymer portion A containing monomer units a and monomer units b in a specific proportion and a copolymer portion B containing monomer units c and monomer units d in a specific proportion are copolymer portions which differ from each other.

When a copolymer contains a copolymer portion A having monomer units a and monomer units b in a proportion of 10:1 and a copolymer portion B having monomer units a and monomer units b in a proportion of 1:10, the portions A and B differ from each other.

A copolymer incorporated into the composition of the present invention for peelable coating is prepared through multi-step polymerization.

Multi-step polymerization is a type of polymerization process including a plurality of polymerization steps, and examples include multi-stage feed (MSF) polymerization and power feed (PF) polymerization.

The copolymer incorporated into the composition of the present invention for peelable coating may contain two or more acrylic copolymer portions A and/or portions B in one molecule.

The composition of the present invention may contain an acrylic copolymer portion A and an acrylic copolymer portion B which are not linked to each other; i.e., the two polymer portions may exist as individual polymer portions.

In the present invention, the term "core/shell polymer" encompasses not only polymer particles of a typical core/shell structure but also a variety of core/shell particles having two or more portions; e.g., particles in which the core is incompletely covered with a shell and particles containing a plurality of cores.

Figure 1A:
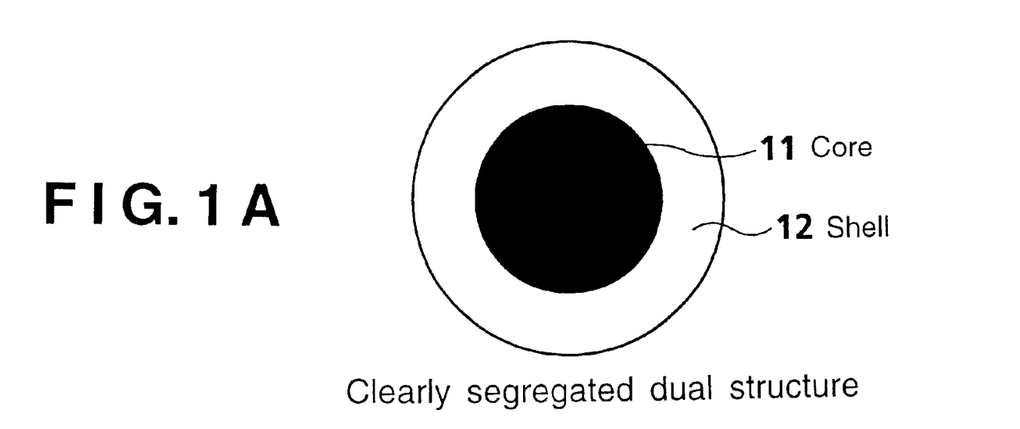
FIG. 1A shows a clearly segregated dual structure of a particle in an emulsion.
Figure 1B:
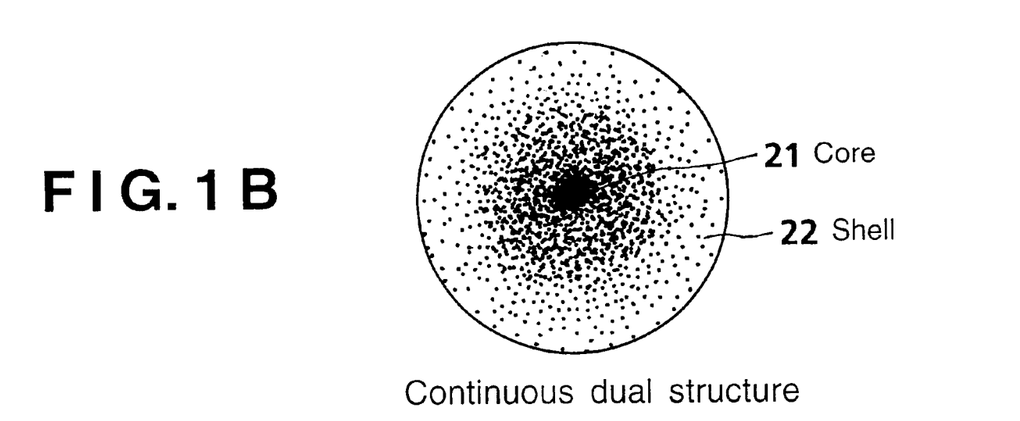
FIG. 1B shows a continuous dual structure of a particle in an emulsion.

Specifically, a core/shell polymer which is obtained through multi-step polymerization according to the present invention and is contained in an emulsion has a structure represented by FIG. 1A. In the clearly segregated core/shell structure, a core 11 is formed of congregated particles of copolymer portion A having a high Tg, and a shell 12 is formed of congregated particles of copolymer portion B having a low Tg and covers the core 11. FIG. 1B shows a continuous core/shell structure in which a number of small-domain cores 22 having a high Tg are dispersed within a shell 21 having a low Tg.

Figure 1C:
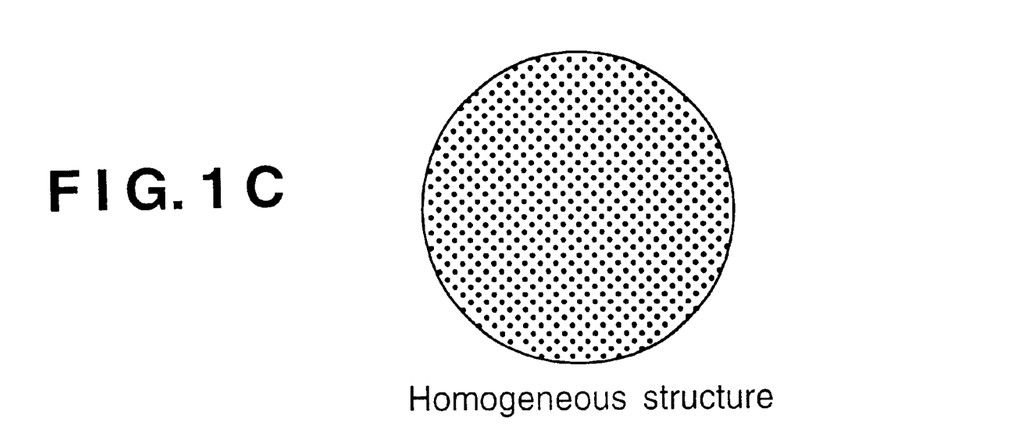
FIG. 1C shows the homogeneous structure of a particle in an emulsion.

FIG. 1C shows a homogeneous structure which is already disclosed in Japanese Patent Application Laid-Open (kokai) No. 9-286934.

As shown in the test results of the samples obtained from the Examples described below, the composition of the present invention for peelable coating, containing a copolymer of a heterogeneous core/shell structure, can form a peelable protective film at ambient temperature after a time period as short as approximately one hour after application. Thus, the formation step for the protective film can be shortened greatly.

Examples of monomers which are used to prepare acrylic copolymer portions A and B include alkyl esters of acrylic acid or methacrylic acid, such as methyl (meth)acrylate, ethyl (meth)acrylate, propyl (meth)acrylate, isopropyl (meth)acrylate, n-butyl (meth)acrylate, isobutyl (meth) acrylate, sec-butyl (meth)acrylate, t-butyl (meth)acrylate, pentyl (meth)acrylate, isopentyl (meth)acrylate, hexyl (meth)acrylate, 2-ethylhexyl (meth)acrylate, octyl (meth) acrylate, 3,5,5-trimethylhexyl (meth)acrylate, decyl (meth) acrylate, dodecyl (meth)acrylate, cetyl (meth)acrylate, octadecyl (meth)acrylate, octadecenyl (meth)acrylate, and cyclohexyl (meth)acrylate; and hydroxy esters of acrylic acid or methacrylic acid, such as hydroxyethyl (meth) acrylate and hydroxypropyl (meth)acrylate.

The terms "(meth)acrylic" and "(meth)acrylate" as used herein refer to acrylic or methacrylic, and acrylate or methacrylate, respectively.

Examples of other monomers which are also used to prepare acrylic copolymer portions A and B include vinyl monomers having an acidic functional group, such as acrylic acid, methacrylic acid, crotonic acid, itaconic acid, fumaric acid, maleic acid, monomethyl itaconate, monomethyl fumarate, monobutyl fumarate, and maleic anhydride; other vinyl monomers such as sodium vinylsulfonate; phosphoethyl (meth) acrylate; glycidyl methacrylate; acetoacetylethyl methacrylate; acrolein or methacrolein; dicyclopentadienyl methacrylate, styrene or substituted styrene; butadiene; ethylene; and vinyl acetate or other vinyl esters. In addition, polyfunctional unsaturated monomers such as ethylene glycol dimethacrylate, diethylene glycol dimethacrylate, divinylbenzene, trimethylolpropane trimethacrylate, and allyl methacrylate may be used in a small amount.

Preferably, nitrogen-containing monomers and nitrogen-containing polyfunctional unsaturated monomers are not used in the present invention, since these monomers generate environmental pollutants such as nitrogen oxide when peeled coating film is incinerated during waste disposal.

Thus, the acrylic copolymer portions A and B contained in the copolymer employed in the composition of the present invention for peelable coating contain no monomer unit formed of a nitrogen-containing vinyl monomer.

The copolymer incorporated into the composition of the present invention comprises 5–40 wt. %, preferably 10–40 wt. %, more preferably 20–40 wt. %, of the acrylic copolymer portion A and 60–95 wt. %, preferably 60–90, more preferably 60–80 wt. %, of the acrylic copolymer portion B, on the basis of the total amount of the portion A and the portion B.

The homopolymer obtained from the hard-polymer-providing monomer employed in the present invention preferably has a glass transition temperature of 50° C.–110° C., more preferably 60° C.–110° C., most preferably 70° C.–110° C.

Similarly, the homopolymer obtained from the soft-polymer-providing monomer employed in the present invention preferably has a glass transition temperature of −10° C. to −90° C., more preferably −20° C. to −90° C., most preferably −30° C. to −90° C.

Each copolymer portion of the present invention preferably contains a hard-polymer-providing monomer unit and a soft-polymer-providing monomer unit in a total amount of 70 wt. % or more, more preferably 80 wt. % or more, most preferably 90 wt. % or more.

In a preferred embodiment for carrying out the present invention, the composition of the present invention comprises 20–40 wt. % of the acrylic copolymer portion A, on the basis of the total amount of the portion A and the portion B, containing at least one monomer unit of a monomer providing a homopolymer having a glass transition temperature of 70° C. to 110° C. and at least one monomer unit of a monomer providing a homopolymer having a glass transition temperature of −30° C. to −90° C.; and 60–80 wt. % of the acrylic copolymer portion B, on the basis of the total amount of the portion A and the portion B, containing at least one monomer unit of a monomer providing a homopolymer having a glass transition temperature of 70° C. to 110° C. and at least one monomer unit of a monomer providing a homopolymer having a glass transition temperature of −30° C. to −90° C.

Examples of preferred hard-polymer-providing monomers include methyl methacrylate, ethyl methacrylate, isobutyl methacrylate, hydroxyethyl methacrylate, hydroxyproyl methacrylate, and styrene. Examples of preferred soft-polymer-providing monomers include ethyl acrylate, n-butyl acrylate, s-butyl acrylate, 2-ethylhexyl acrylate, and hydroxyethyl acrylate.

More preferably, a vinyl monomer having an acidic functional group such as a carboxyl group or a hydroxyl group is employed as the above monomer, in view of an increase in adhesion of the formed protective film. The vinyl monomer is incorporated in an amount of 0.2–2.0 wt. % on the basis of the total amount of the monomers, preferably 0.3–1.0 wt. %.

When the acidic-group-containing vinyl monomer is incorporated in an amount of more than 2.0 wt. %, the water resistance of the resultant coating is poor and adhesion increases to an excessive degree. Thus, the coating film might not be peelable if exposed to heat or remains outdoors for a prolonged period.

No particular limitation is imposed on the acidic-group-containing vinyl monomers, and among these monomers forming an acrylic copolymer emulsion, carboxyl-group-containing vinyl monomers such as (meth)acrylic acid, itaconic acid, citraconic acid, and crotonic acid may be used.

In the most preferred mode for carrying out the invention, acrylic copolymer portions A and B are produced from methyl methacrylate as a hard-polymer-providing monomer, butyl acrylate as a soft-polymer-providing monomer, and acrylic acid as an acidic-group-containing vinyl monomer.

The copolymer incorporated into the composition of the present invention preferably has a molecular weight of 20,000 or more, more preferably 50,000–1,000,000, most preferably 50,000–600,000.

In the present invention, unless otherwise specified, molecular weight is weight average molecular measured through GPC. Polystyrene is employed as a standard for measurement of molecular weight.

Each of acrylic copolymer portions A and B has a molecular weight of 20,000 or more, more preferably 50,000–1,000,000, most preferably 50,000–600,000.

When the composition of the present invention contains acrylic copolymer A and acrylic copolymer B such that they are not linked to each other, the molecular weight of each acrylic copolymer is obtained by measuring the molecular weight of the non-linked copolymer.

In a peelable protective coating film (hereinafter referred to as "peelable coating film") provided from the composition of the present invention, at least one of the acrylic copolymer portion A and the acrylic copolymer portion B has a continuous structure. The morphology of the core/shell copolymer varies in accordance with conditions, such as the composition and weight-basis proportion of the acrylic copolymer portion A and the acrylic copolymer portion B and conditions of film formation. Preferably, the acrylic copolymer portion B has a continuous structure and the acrylic copolymer portion A has a non-continuous structure.

An example method for producing a copolymer which is incorporated into the composition of the present invention for peelable coating will next be described.

The method includes
1) forming an acrylic copolymer portion B having a glass transition temperature of 5° C. to −30° C. by use of a monomer mixture b providing low Tg; and
2) in the presence of the acrylic copolymer portion B, forming an acrylic copolymer portion A having a glass transition temperature of 30° C.–70° C. by use of a monomer mixture a providing high Tg,
   with monomer mixture a accounting for 5–40 wt. % and monomer mixture b accounting for 60–95 wt. % on the basis of the total amount of the monomer mixtures a and b; monomer mixtures a and b containing the same hard-polymer-providing monomer unit and soft-polymer-providing monomer unit; and each monomer mixture containing a hard-polymer-providing monomer and a soft-polymer-providing monomer in a total amount of 70 wt. % or more.

The above steps may be carried out continuously, or seed polymerization may be performed by use of pre-prepared acrylic copolymer B employed as seeds. Preferably, the steps are carried out continuously.

The copolymers employed in the composition of the invention for peelable coating are preferably prepared through emulsion polymerization or solution polymerization by use of a free radical initiator. Either thermal initiation or redox initiation may be employed.

The above polymerization is typically initiated in the presence of a known free radical initiator, typically in an amount of 0.05%–3.0% on the basis of the total amount of monomers. A redox system including a similar initiator and a favorable reducing agent may also be employed in an equiamount. A chain-extender may also be used in an effective amount such that a desired GPC weight average molecular weight is attained.

In the case in which the copolymers employed in the composition of the present invention are in the form of dispersed polymers, the particle size of the copolymers is regulated by controlling the amount of a known surfactant added during emulsion polymerization.

Examples of known surfactants include anionic emulsifiers, nonionic emulsifiers, and a combination thereof. The surfactant is typically added in an amount of 0.1–6 wt. % based on the total amount of monomers.

In the present invention, a reactive surfactant may be employed as a surfactant instead of conventionally known surfactants. Examples of reactive surfactants include Aqualon RN (=Noigen RN; product of Dai-Ichi Kogyo Seiyaku Co., Ltd.) series (polyoxyethylene alkylphenyl ether nonionic surfactants in which a radical-polymerizable propenyl group is introduced to a hydrophobic group); Aqualon HS (=Hitenol HS ; product of Dai-Ichi Kogyo Seiyaku Co., Ltd.) series (anionic surfactants, sulfate ester salts of Aqualon RN series); Eleminol RS30 and Eleminol JS-2 (products of Sanyo Chemical Industries, Ltd.) (acrylic anionic surfactants); and Adeka Reasoap (product of Asahi Denka Kogyo K.K.) series (acrylic anionic surfactants).

The aforementioned reactive surfactants are added during synthesis of acrylic copolymer emulsion so as to enhance the water resistance of the formed coating film.

In the case in which the copolymers employed in the composition of the present invention are in the form of dispersion, dispersed particles preferably have a particle size of 50–200 nm, more preferably 50–150 nm, most preferably 50–120 nm.

When the size is in excess of 200 nm, the formed coating film cannot assure a sufficient adhesion area to the object to be covered, and high water resistance cannot be attained.

In addition to the aforementioned copolymers, the composition of the present invention for peelable coating may contain a peelability-enhancing agent.

At least one species selected from among waxes, silicones, alkyl phosphate esters, and fluorine-containing compounds is suitably employed as the peelability-enhancing agent. These may be used in the form of an aqueous solution or dispersion or powder.

Examples of waxes include plant waxes such as candelilla wax, carnauba wax, rice wax, Japan wax, and jojoba oil; animal waxes such as beeswax, lanolin, and spermaceti; mineral waxes such as montan wax, ozocerite, and ceresine; petroleum waxes such as paraffin wax, microcrystalline wax, and petrolatum; synthetic hydrocarbon waxes such as Fischer-Tropsch wax, Oxidized Polyethylene wax, polyethylene wax, and acrylic-ethylene copolymer wax; modified waxes such as montan wax derivative, paraffin wax derivative, and microcrystalline wax derivative; hydrogenated waxes; and hardened castor oil and its derivatives. Examples further include 1,2-hydroxystearic acid, stearic acid amide, phthalic anhydride imide, bisamide, amide, glycerin ester, sorbitan ester, higher alcohol having 12 or more, preferably 18 or more carbon atoms, and higher fatty acid having 12 or more, preferably 18 or more carbon atoms.

The above waxes preferably have a melting point of 40–180° C., more preferably approximately 50–150° C. When the melting point falls outside the range, peelability of the formed coating film does not increase commensurately with the addition. Examples of emulsion of the above waxes include Hidorin D-337, Hidorin P-7, Hidorin E-139, Selosol 967, Selosol M, Poriron A, Selosol 524, Selosol 920, and Selosol B-495 (products of Chukyo Yushi Co., Ltd.).

When silicone compounds are employed as peelability-enhancing agents, silicones such as silicone oil having a siloxane backbone, silicone powder, silicone emulsion, and aqueous silicone resin may be used. Specifically, dimethylpolysiloxanes, methylphenylpolysiloxanes, cyclic dimethylpolysiloxane, fluoropolysiloxanes, and modified silicone oil, e.g., silicone modified with amino, epoxy, polyether, alcohol, fluorine, mercapto, carboxyl, or alkyl higher fatty acid may be used. Examples of silicone compounds include silicone oils such as KF 96, KF 994, KF 995, KF 851, FL 100, KF 857, KF 101, and X-22-3701E (products of Shin-Etsu Chemical Co., Ltd.); silicone powders such as R 900, R 901, R 902, F 100, F 101, F 200, F 201, F 202, F 203, F 400, F 300, F 301, F 250, E 500, E 501, E 600, E 601, E 602, E 603, and E 850 (products of Dow Corning Toray Co., Ltd.); silicone emulsions such as KM 70, KM 71, KM 72, KM 75, KM 85, KM 722, KM 740, KM 753, KM 764E, KM 765, KM 766, KM 780, KM 883, KM 885, KM 901, KM 2002, and KM 244F (products of Shin-Etsu Chemical Co., Ltd.); and aqueous silicone resins such as SH 3746, SH 3749, and SH 3771 (products of Dow Corning Toray Co., Ltd.). The silicone powders employed in the invention typically have an average particle size of approximately 0.1–100μ, preferably approximately 5–50μ.

Among silicon compounds, polyether-modified silicon oil represented by the following formula:

wherein POA represents a polyether moiety introduced by ethylene oxide- or propylene oxide-modification, is preferred in that the silicone oil is hardly soluble in water and readily forms water dispersion in the presence of a small amount of a surfactant. Coating film obtained from such silicon oil exhibits sufficient molecular orientation in a bottom portion and has excellent performance in relaxing an time-elapsed increase in adhesion at an interface between coating film and an object.

Examples of alkyl phosphate esters which may be used in the present invention include Separl #328, Separl #365, Separl #380, Separl #440, Separl #441, Separl #517, and Separl #521 (products of Chukyo Yushi Co., Ltd.)

Among the fluorine compounds, a compound containing fluoroalkyl group in the molecule is preferred. Examples include perfluoroalkyl carboxylate salts, perfluoroalkyl phosphate salts, perfluoroalkylpentanone, and perfluoroalkyl EO adducts. Specific examples include Fluorad FC-93, Fluorad FC-95, Fluorad FC-98, Fluorad FC-129, Fluorad FC-135, Fluorad FC-170C, Fluorad FC-430, and Fluorad FC-431 (products of Sumitomo 3M Ltd.).

Among these peelability-enhancing agents, waxes and silicone compounds are advantageously used in that coating film having excellent water resistance and acid resistance is readily formed.

The peelability-enhancing agent of wax is typically added in an amount of approximately 0.5–30 parts by weight, preferably approximately 1–20 parts by weight based on 100 parts of the solid component of copolymers. The peelability-enhancing agent of silicone is typically added in an amount of approximately 0.01–10 parts by weight, preferably approximately 0.1–5 parts by weight. The peelability-enhancing agent of alkyl phosphate ester is typically added in an amount of approximately 0.01–10 parts by weight, preferably approximately 0.1–5 parts by weight. The peelability-enhancing agent of fluorine compound is typically added in an amount of approximately 0.01–5 parts by weight, preferably approximately 0.01–3 parts by weight.

The composition of the present invention for peelable coating may contain additives for film formation typically employed in the art. Examples include plasticizers such as phthalate esters and fatty acid esters; film-formation aids such as mono- and diethylene glycol alkyl ethers and mono- and dipropylene glycol alkyl ethers; pigments, dyes, extenders, and defoaming agents such as mineral oil and silicone; wetting agents, dispersants, and thickeners such as organic and inorganic agents; pH-controlling agents such as organic alkalis, and ethanolamines; preservatives such as benzoisothiazolines and triazines; anti-freezing agents such as polyhydric alcohols; drying-accelerators such as lower alcohols, e.g., ethanol; slipping agents; UV-absorbers such as benzotriazoles and benzophenones; stabilizers to counter the deleterious effects of light; and cross-linking agents.

The film-formation aid is a type of film-forming agent which is evaporated from the applied layer after a volatile and water-soluble organic solvent and water contained in the layer have been substantially evaporated.

The composition of the present invention for peelable coating may further contain any solvent. The composition of the present invention typically has a solid content of 30–60 wt. % based on the total weight of the composition, preferably 40–60 wt. %. The solid content may be appropriately adjusted in accordance with a coater, application conditions, and use of the composition.

The present invention also provides an object having thereon a peelable coating film which is obtained from the composition and a method for protecting an object, which method comprises forming, on a surface of the object, a peelable coating film obtained from the composition.

The composition of the present invention can be applied onto an object to be coated by means of any customary method employed in the art, such as spray coating or painting, or by use of rollers or brushes. In use, the composition may be diluted with water or with a water-miscible solvent in accordance with the type of coating apparatus and coating conditions. Other coating-related conditions such as coating temperature are suitably determined within the knowledge of persons having ordinary skill in the art.

The object coated with the composition of the present invention for peelable coating is dried at ambient temperature (5–35° C.±5° C.), preferably at approximately 20–25° C., thereby forming a peelable protective film.

In order to accelerate evaporation of water during formation of a protective film, means for removing water such as ventilation and/or heating may be appropriately employed. In this case, the time required for forming a protective film can be readily controlled. However, the heating means is employed only to evaporate water, and conventionally employed heating for forming a protective film is not required.

The composition of the present invention for peelable coating provides a coating endowed with both excellent physical properties and peelability. Particularly, the formed coating has excellent properties such as water resistance, light resistance, and thermal stability, and maintains its excellent peelability after storage for a long period of time. In addition, the composition of the present invention for peelable coating provides a coating which imparts excellent properties to the formed film under a wide range of application temperatures.

In the composition of the present invention, component polymers are not cross-linked. Thus, peeled protective film requires no particular waste treatment, and can be recycled as a raw material for producing the composition of the present invention again. The composition has been made with consideration being given to resource saving and addressing environmental problems.

No particular limitation is imposed on the object to which the composition of the present invention is to be applied, and examples of objects include ferrous or nonferrous metallic articles such as automobiles, other vehicles, mechanical parts, and houseware; wood articles; glass products; plastic products; rubber products; ceramic products; building materials (ferrous and nonferrous such as aluminum); domestic electrical appliances such as washers and refrigerators; furniture; articles for factory automation (FA); office articles such as cabinets and white boards; and painted products thereof. The composition of the present invention for peelable coating is applied to an object so as to protect the object both indoors and outdoors.

The protective film according to the present invention may also be applied to objects which have been conventionally covered with tacky film or wrapped with a bag (polyethylene-made, paper-made, etc.).

Needless to say, the protective film of the present invention may also be employed so as to protect an object temporarily. Specifically, the film can be employed for preventing stains and scratches or UV-induced deterioration occurring to painted outer panels or resin parts of automobiles; protecting mechanical parts from blemishes such as corrosion; protecting ventilators and kitchenware from dirt caused by oil and the handling; preventing stains and scratches to aluminum-made fences and indoor floors; protecting walls and floors in a painting booth from paint splatters; and preventing damage to and maintaining the appearance of ski boards made of FRP (fiber reinforced plastics).

Since conventional compositions for peelable coating must be heated to form film, coating may not be possible, depending on the objects to be protected. However, since the composition of the present invention for peelable coating provides a protective film without heating, the composition is applicable to devices having electronic parts such as integrated circuits (ICs) and capacitors, plastic products which are easily deformed by heat, etc.

EXAMPLES

The present invention will next be described in more detail by way of examples, which should not be construed as limiting the invention thereto.

Examples 1 to 7

Monomers employable in a first polymerization step and those for employing a second polymerization step were prepared from components in the compositional proportions shown in Table 1. Subsequently, polymers 1 to 7 were prepared from the above monomers through two-step emulsion polymerization.

1) Production of Monomer Mixtures Used in the First Polymerization Step

A UV-absorber was dissolved in methyl methacrylate. To the resultant solution, deionized water and a 25% aqueous solution of nonylpropenylphenyl ethoxy ether sulfate ammonium (HS-10, product of Dai-Ichi Kogyo Seiyaku Co., Ltd.) were added. The mixture was emulsified through stirring, and another monomer was slowly added, to thereby prepare an emulsified monomer mixture.

2) Production of Monomer Mixtures Used in the Second Polymerization Step

A 25% aqueous solution of HS-10 was added to deionized water, and the solution was stirred. Monomers were added to the solution, to thereby prepare an emulsified monomer mixture.

3) Preparation of Polymers 1 to 7 Through Emulsion Polymerization

A solution containing a 25% HS-10 solution (34.0 g) and deionized water (1048.7 g) was placed in an appropriate reactor equipped with a thermometer, a cooling apparatus, and a stirrer. The solution was heated to 80–85° C. Subsequently, a solution of sodium carbonate (5.8 g) in deionized water (33.0 g) and a solution of sodium persulfate (6.1 g) in deionized water (26.7 g) were sequentially fed into the reactor. Approximately two minutes after addition of the two solutions, the monomer mixture used in the first polymerization step was added gradually. The rate of addition was controlled such that heat generated during polymerization could be removed by cooling, with the addition time being 90–150 minutes.

The polymerization temperature was maintained at 80–90° C. by cooling when necessary. After completion of addition, the container and feed line of the monomer mixture were rinsed out with deionized water (31.6 g), and the rinse solution was introduced into the reactor. The combined mixture was maintained at 80–90° C. for 30 minutes. Thereafter, a solution of sodium persulfate (1.2 g) in deionized water (6.5 g) was added to the mixture. The monomer mixture used in the second polymerization step was then added gradually. The rate of addition was controlled such that heat generated during polymerization could be removed by cooling, with the addition time being 30–90 minutes. The polymerization temperature was maintained at 80–90° C. by cooling when necessary. After completion of addition, the container and feed line of the monomer mixture were rinsed out with deionized water (21.0 g), and the rinse solution was introduced into the reactor. The resultant polymer was cooled to room temperature. In the above-described manner, polymers 1 to 7 were prepared.

Table 1 shows compositional proportions of monomers used in the first and the second polymerization steps, calculated glass transition temperature, and monomer balance in weight between the first step and the second step.

In Table 1, the following abbreviations are used: BA denotes butyl acrylate, 2-EHA 2-ethylhexyl acrylate, MMA methyl methacrylate, RUVA 93 reactive UV-absorber, Sty styrene, and AA acrylic acid.

TABLE 1(1)

|  | Example 1 | | Example 2 | | Example 3 | | Example 4 | |
| --- | --- | --- | --- | --- | --- | --- | --- | --- |
|  | 1st step | 2nd step | 1st step | 2nd step | 1st step | 2nd step | 1st step | 2nd step |
| Deionized water | 330.6 | 220.4 | 358.7 | 165.3 | 330.6 | 220.4 | 330.6 | 220.4 |
| HS 10 (25%) | 102.3 | 68.2 | 119.4 | 51.2 | 102.3 | 68.2 | 102.3 | 68.2 |
| BA | 598.5 | 214.8 | 701.8 | 161.1 | 60.16 | 214.9 | 642.5 | 214.9 |
| 2-EHA |  |  |  |  |  |  | 10.2 |  |
| MMA | 402.5 | 463.8 | 402.5 | 463.8 | 402.5 | 463.8 | 402.5 | 463.8 |
| RUVA 93 | 17.0 |  | 8.4 |  | 11.2 |  | 7.2 |  |
| Sty |  |  |  |  |  | 204.6 |  |  |
| AA (80%) | 6.4 | 4.3 | 7.5 | 3.2 | 6.4 | 4.3 | 6.4 | 4.3 |
| Calculated Tg | —10 | 35 | −10 | 35 | −10 | 34 | −16 | 35 |
| Monomer balance | 6 | 4 | 7 | 3 | 6 | 4 | 6 | 4 |

TABLE 1(2)

|  | Example 5 | | Example 6 | | Example 7 | |
| --- | --- | --- | --- | --- | --- | --- |
|  | 1st step | 2nd step | 1st step | 2nd step | 1st step | 2nd step |
| Deionized water | 385.7 | 165.3 | 330.6 | 220.4 | 385.7 | 165.3 |
| HS 10 (25%) | 119.4 | 51.2 | 102.3 | 68.2 | 119.4 | 51.2 |
| BA | 749.6 | 161.1 | 642.5 | 173.9 | 749.6 | 130.4 |
| 2-EHA | 11.9 |  | 10.2 |  | 11.9 |  |
| MMA | 402.5 | 463.8 | 402.5 | 463.8 | 402.5 | 463.8 |
| RUVA 93 | 8.4 |  | 7.2 |  | 8.4 |  |
| Sty |  |  |  |  |  |  |
| AA (80%) | 7.5 | 3.2 | 6.4 | 4.3 | 7.5 | 3.2 |
| Calculated Tg | −17 | 35 | −16 | 46 | −10 | 46 |
| Monomer balance | 7 | 3 | 6 | 4 | 7 | 3 |

Polymer 7, which was obtained in Example 7 through emulsion polymerization, was used to prepare compositions 1 to 4 for the peelable coatings shown in Table 2 as Formulations 1 to 4.

A composition serving as a Comparative Example was prepared from a conventional acrylic emulsion which was prepared in a manner similar to that employed for preparing Formulation 2.

TABLE 2

|  | Formulation 1 | Formulation 2 | Formulation 3 | Formulation 4 | Comp. Formulation |
| --- | --- | --- | --- | --- | --- |
| Emulsion | 95 | 95 | 95 | 95 | 95 |
| Water | 1 | 4.8 | 3 | 5 | 5 |
| TT 935 | 0.1 | 0.1 | 0.1 | 0.1 | 0.1 |
| 5% NaOH | 1 | 1 | 1 | 1 | 1 |
| 28% NH$_4$OH | 0.5 | 0.5 | 0.5 | 0.5 | 0.5 |
| Formater AP | 0.4 | 0.4 | 0.4 | 0.4 | 0.4 |
| Hidorin D-337 | 4 | — | — | — | — |
| KF-315 | — | 0.2 | — | — | 0.2 |
| FC-170C | — | — | 2 | — | — |

Tests for Evaluating Physical Properties

Each of the above-described compositions obtained from Formulations 1 to 4 and Comparative Formulation was applied to a substrate to a thickness when dry of 50μ and dried for six hours at 20° C. The thus-prepared film was cut into a test piece (e.g., into a certain shape and dimensions), which was subjected to a tensile test and a dynamic viscoelasticity test. A tensile test was carried out at 10° C., and results thereof are described with reference to FIG. 2.

Figure 2:
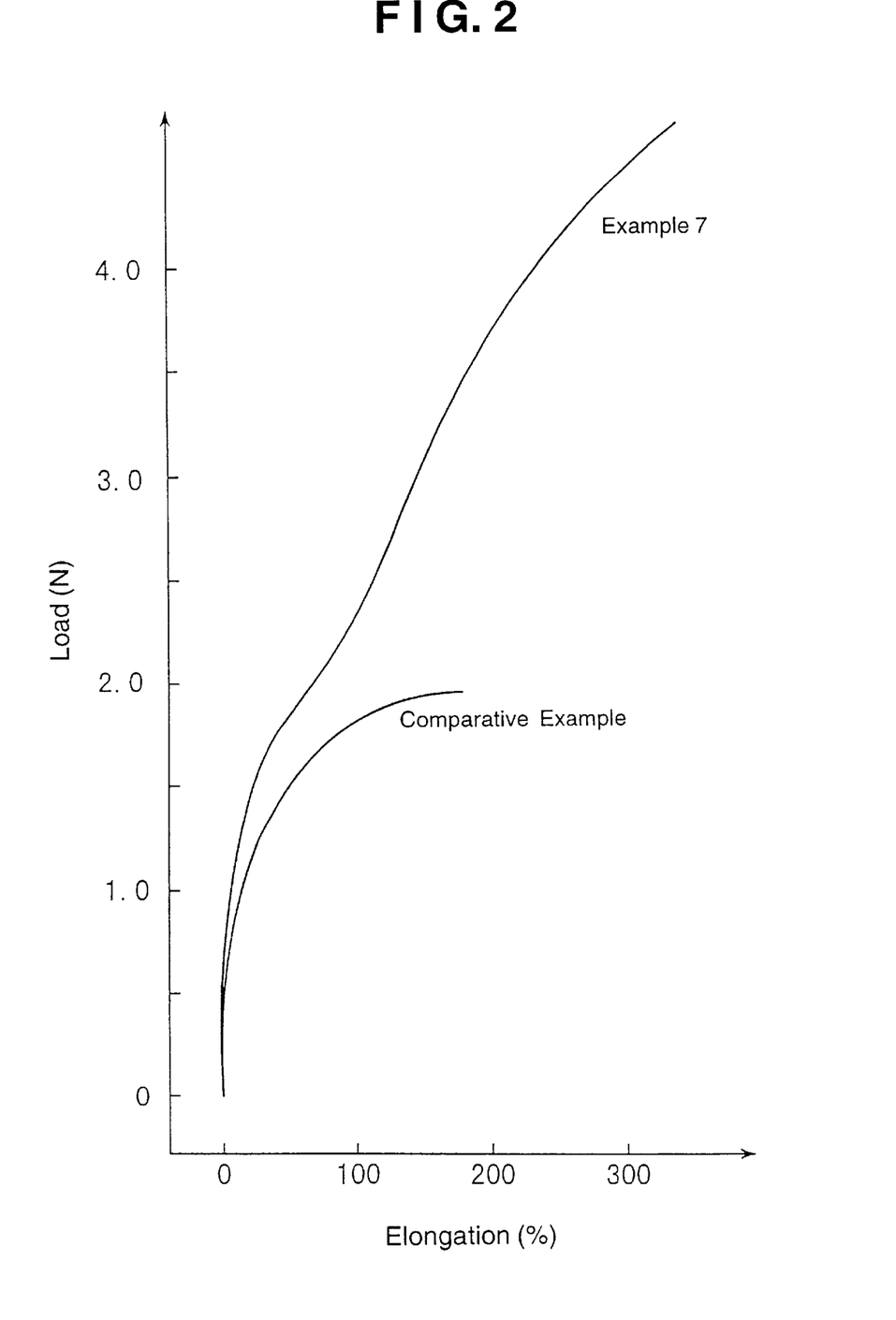
FIG. 2 is a graph showing tensile test results of peelable protective films obtained in Example 7 and a Comparative Example.

As shown in FIG. 2, the composition prepared from polymer 7 exhibits an excellent tensile characteristic.

Figure 3:
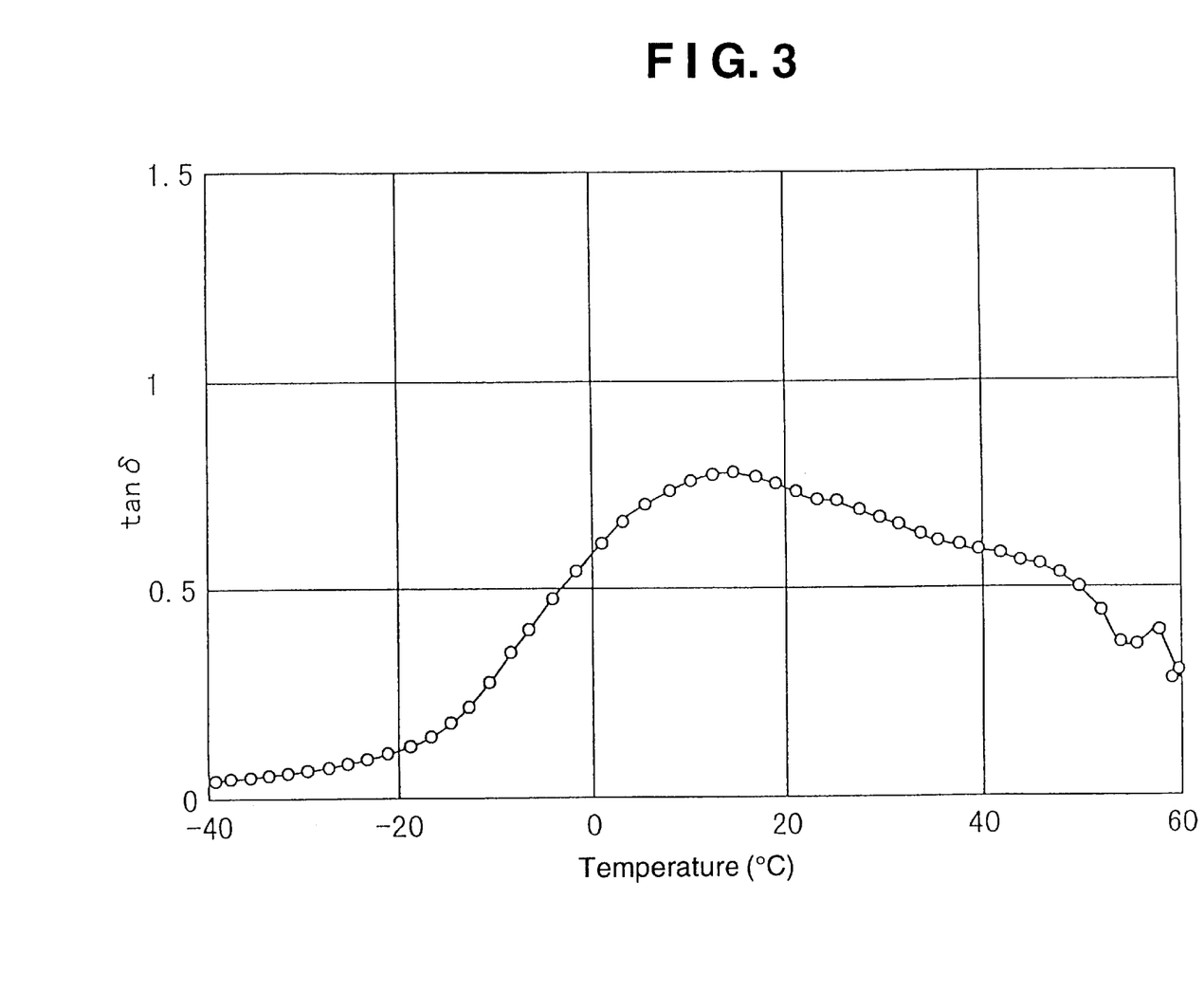
FIG. 3 is a graph showing the dynamic viscoelasticity temperature characteristics of a peelable protective film obtained from an emulsion-polymerized product of Example 7.
Figure 4:
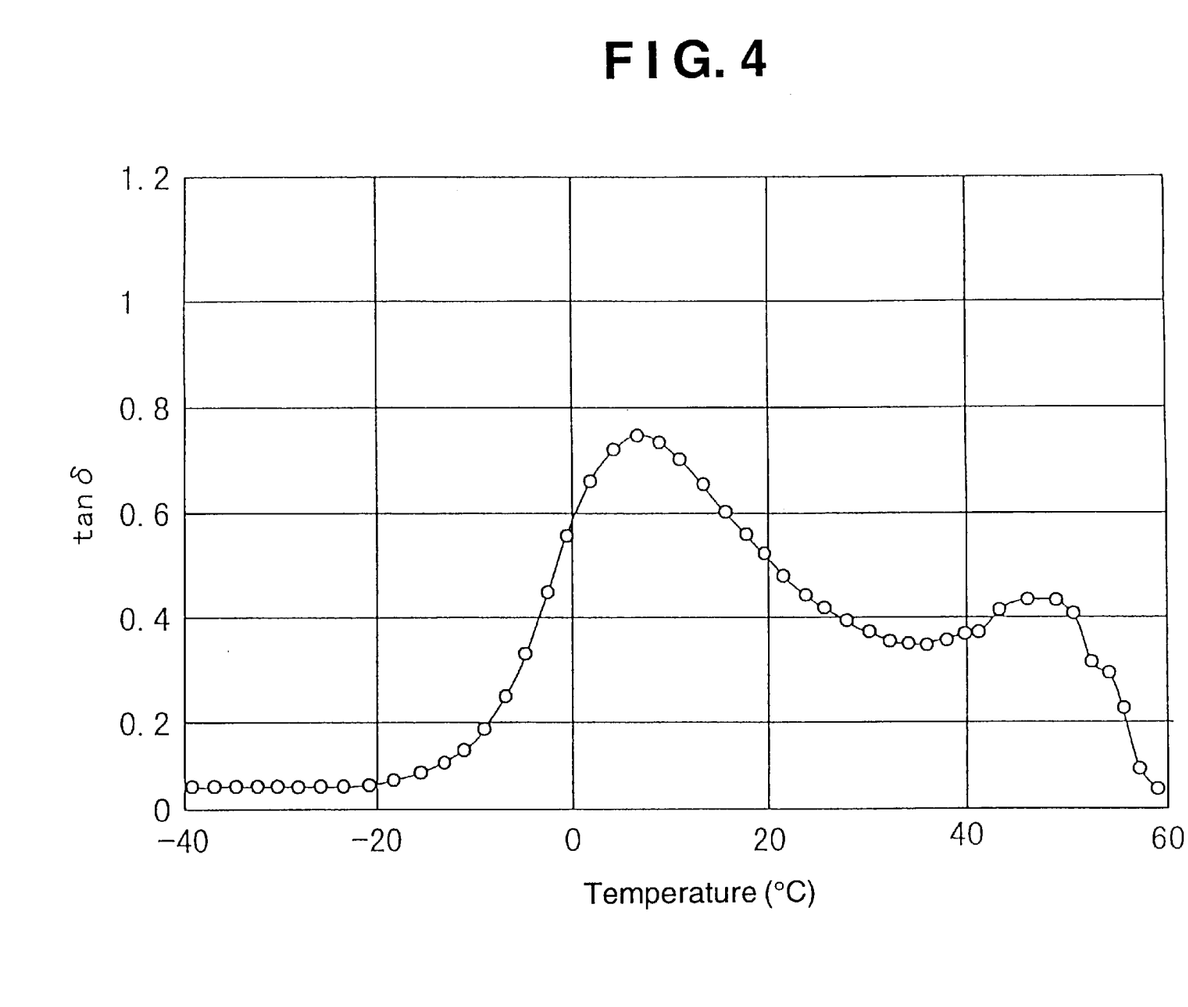
FIG. 4 is a graph showing a the dynamic viscoelasticity temperature characteristics of a peelable protective film obtained from an emulsion-polymerized product of the Comparative Example.

FIG. 3 shows test results on dynamic viscoelasticity of protective film formed of the composition prepared from polymer 7, and FIG. 4 shows similar test results for the protective film of the Comparative Example.

When subjected to the dynamic viscoelasticity measurement, the protective film obtained from a conventional emulsion (Comparative Example) exhibited clear double peaks in the tan δ-temperature profile (FIG. 4). In contrast, peelable coating film obtained from the composition 7 exhibits a broad single peak (FIG. 3).

Thus, it is confirmed that the composition of the present invention provides coating film comprising a copolymer of a continuous core/shell structure.

Tests for Evaluating Peelability

An aminoalkyd resin coating was sprayed onto a mild steel sheet which had been electrodeposition-treated. When the coating became tack-free, a clear coating formed of acrylic resin was sprayed thereon. The thus-coated sheet was heated at 140° C. for 20 minutes, to thereby prepare a bake-coated sheet. Next, a composition for peelable coating was applied to the sheet at a thickness when dry of 70μ, thereby preparing a test piece.

Peelability of the film obtained from a composition for peelable coating was evaluated on the basis of how easy it was to peel off the film by hand.

In Table 2, TT 935 (trade name) is a thickener, product of Rohm & Haas Co., and Formater AP (trade name) is a defoaming agent, product of San Nopco Ltd.

The emulsion employed in the Comparative Formulation was an aqueous dispersion of peelable coating composition disclosed in Japanese Patent Application Laid-Open (kokai) No. 9-286934. Specifically, a 7:3 mixture of high-Tg acrylic emulsion (JP 202) and low-Tg acrylic emulsion (JP 203), wherein JP 202 is an acrylic emulsion of a polymer having a glass transition temperature of 8° C. (solid content 47.5%, Primal JP-202, product of Rohm & Haas Co.), and JP 203 is an acrylic emulsion of a polymer having a glass transition temperature of 41° C. (solid content 47.5%, Primal JP-203, product of Rohm & Haas Co.).

Initial peelability refers to peelability which was measured after drying under the temperature conditions shown in Table 3 and cooling to room temperature.

Peelability after heating refers to peelability which was measured after the test piece was allowed to stand in a thermostat bath at 80° C. for 500 hours.

Peelability after an accelerated weather resistance test refers to peelability which was measured after the test piece was subjected to an accelerated weather resistance test for 500 hours using a Sunshine Weather-O-Meter (SWOM).

Water resistance was evaluated by observing the level of whitening of the coating film after drying the test piece under the temperature conditions shown in Table 3, dripping water (25° C.) onto the test piece, and allowing the test piece to stand for four hours.

The results of the evaluation are scored as follows:
AA: excellent
BB: good
CC: fair
DD: poor In the water resistance test, the score "DD" denotes that whitening or peeling of the coating film was observed.

The results are shown in Table 3.

TABLE 3

|  | Formulation 1 | Formulation 2 | Formulation 3 | Formulation 4 | Comp. Formulation |
|---|---|---|---|---|---|
| Initial peelability, Dried |  |  |  |  |  |
| 1) 20° C. × 6 hrs | AA | AA | AA | AA | DD |
| 2) 80° C. × 15 min | AA | AA | AA | AA | AA |
| Peelability after heating | BB | AA | AA | BB | BB |
| Peelability after weather test | BB | AA | AA | BB | BB |
| Water resistance, dried under |  |  |  |  |  |
| 1) 20° C. × 6 hrs | BB | BB | BB | BB | DD |
| 2) 80° C. × 15 min | AA | AA | AA | AA | BB |

As is clear from Table 3, the compositions of the present invention for peelable coating exhibit excellent peelability; i.e., maintain excellent initial peelability regardless of the presence of a peelability-enhancing agent, even though these compositions are dried at room temperature.

In addition, Formulations 2 and 3, which contain a peelability-enhancing agent, exhibit further enhanced peelability after heating.

Figure 5A:
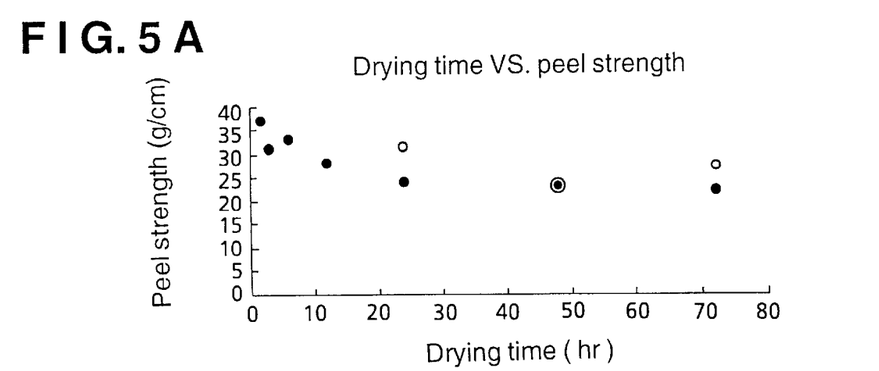
FIG. 5A is a graph showing performance of peelable protective films, drying time vs. peel strength.
Figure 5B:
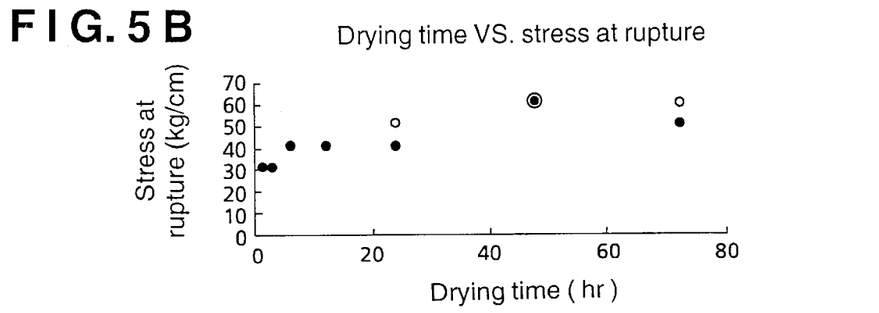
FIG. 5B is a graph showing performance of peelable protective films, drying time vs. stress at rupture.
Figure 5C:
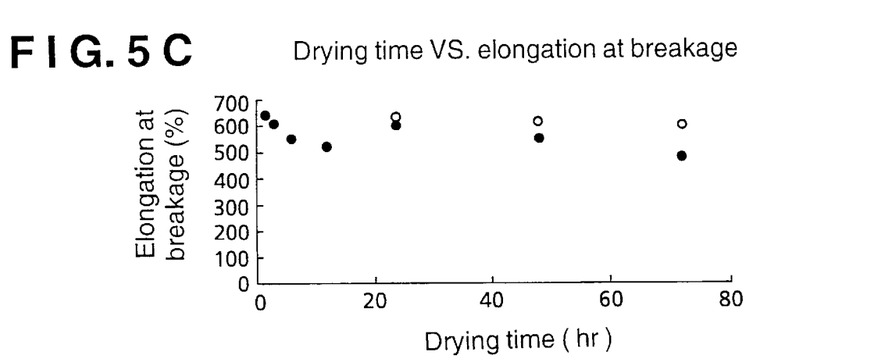
FIG. 5C is a graph showing performance of peelable protective films, drying time vs. elongation at breakage.

FIGS. 5A to 5C show test results of peelable protective films which were obtained from Formulation 1 containing polymer 7 of Example 7 and the Comparative Formulation. Specifically, FIG. 5A is a graph showing drying time vs. peel strength; FIG. 5B is a graph showing drying time vs. stress at rupture; and FIG. 5C is a graph showing performance of peelable protective films, drying time vs. elongation at breakage.

As shown in FIG. 5A, the composition of Formulation 1 containing polymer 7 forms a peelable protective coating film after drying for approximately one hour. By contrast, a protective coating film cannot be completely formed from the composition of Comparative Formulation after a short drying period, and a peelable coating film is only formed after the composition has been dried for 24 hours.

Similarly, the protective coating film obtained from the composition of Formulation 1 can be subjected to a tensile test one hour after drying. However, the protective coating film obtained from the composition of the Comparative Example can be tested only after the composition has been dried for 24 hours.

As described above, the composition of the present invention for peelable coating dispenses with the step of forced heating of the coating composition after application. Thus, considerable savings on the space and costs of a heating apparatus can be attained.

When outer panels of automobiles are protected by use of the composition of the present invention, the composition is applied to the panels and dried at ambient temperature, thereby forming a protective film. In order to form a protective film with higher drying efficiency, a simple ventilating step is included.

Thus, the conventional large-scale heating apparatus can be dispensed with, and operation costs can be reduced considerably.

Particularly, the production line of a flow-work system can be shortened considerably. When a line for forming a peelable coating is added, use of a conventionally employed large-scale apparatus is not necessary.

Protective films which were produced from polymers obtained through emulsion polymerization carried out in Examples 1 to 6 were subjected to the peeling test in the same manner. The films exhibited excellent peelability similar to that of the protective film produced from the polymer obtained in Example 7.

As is clear from the results, the composition of the present invention for peelable coating can be dried even at a low temperature to produce a coating film having excellent physical properties and peelability. The composition of the present invention for peelable coating provides a coating film which has excellent water resistance and weather resistance and excellent peelability even after long-term storage. Thus, the composition of the present invention for peelable coating is particularly suitable for protection of objects which are stored outdoors, such as automobiles.

As described hereinabove, the aqueous composition of the present invention for peelable coating—which forms peelable coating protecting a surface of an object for a specific period of time and being able to be peeled off when no longer required—contains a core/shell copolymer comprising an acrylic copolymer portion A having a high glass transition temperature of 30° C.–70° C. and an acrylic copolymer portion B having a low glass transition temperature of 5° C. to –30° C. and is formed through multi-step polymerization. Thus, the composition provides an excellent peelable film through drying at ambient temperature, and the peelable coating film exhibits long-term water resistance, adhesion, and peelability.

Thus, the composition of the present invention for peelable coating provides a protective coating film which can be employed for (1) preventing stains and scratches or UV-induced deterioration on painted outer panels or resin parts of automobiles; (2) protecting mechanical parts from blemishes such as corrosion; (3) protecting ventilators and kitchenware from dirt caused by oil and handling; (4) preventing stains and scratches to aluminum-made fences; (5) preventing stains and scratches to indoor floors; (6) protecting walls and floors in a painting booth from paint splatters; and (7) preventing damages to and maintaining appearance of ski boards made of FRP (fiber reinforced plastics). The protective effect is higher than that of a protective coating film produced from a conventional composition for peelable coating.

In addition, the composition of the present invention forms peelable coating film without heating. Thus, the composition is applicable to devices having electronic parts such as integrated circuits (ICs) and capacitors, and plastic products which are easily deformed by heat, etc.

What is claimed is:

1. An aqueous composition for forming a removable coating for protecting a surface of an object for a specific period of time and can be removed after providing necessary protection, containing a core/shell copolymer comprising, in the molecule thereof, 5 to 40 weight % of an acrylic copolymer A having a high glass transition temperature of 30° C. to 70° C. and 60 to 95 weight % of an acrylic copolymer B having a low glass transition temperature, each copolymer portion contains a hard-polymer-providing monomer unit and a soft-polymer-providing monomer unit in a total amount of 70 wt. % or more 5° C. to –30° C. and formed through multi-step polymerization, a vinyl monomer having an acidic functional group is contained in an amount of 0.2–2 wt. % based on the total amount of monomer.

2. A composition for a removable coating according to claim 1, wherein particles of the core/shell copolymer assume a continuous dual-phase structure.

3. A composition for a removable coating according to claim 1, wherein the core is made up of the copolymer portion A and the shell is made up of the copolymer of the copolymer portion B.

4. A composition for a removable coating according to claim 1, wherein neither the acrylic copolymer portion A nor the acrylic copolymer portion B contains a monomer unit formed of a nitrogen-containing vinyl monomer.

5. A composition for a removable coating according to claim 1, wherein the reactive surfactant is used during formation of an emulsion of the acrylic polymer portion A or the acrylic copolymer portion B.

6. A composition for a removable coating according to claim 1, wherein the composition contains a removability-enhancing agent.

7. A removable coating film on a substrate which can be easily removed from the substrate obtained from a composition of claim 1.

8. A method for protecting a surface of an object comprising forming, on the surface of the object, a removable coating film obtained from a composition of claim 1.

9. A method for protecting a surface of an object according to claim 8, which method comprises forming the removable protective coating film at 40° C. or lower.

10. The method of claim 8 wherein the core is comprised of copolymer A and the shell is comprised of copolymer B.

11. The method of claim 8 wherein the core/shell copolymer comprises 5 to 40% by weight of copolymer A and 60 to 95% by weight of copolymer B, based on the weight of A plus B.

* * * * *